No. 659,062. Patented Oct. 2, 1900.
J. GAUT.
FOCUSING ATTACHMENT FOR CAMERAS.
(Application filed May 10, 1900.)
(No Model.)
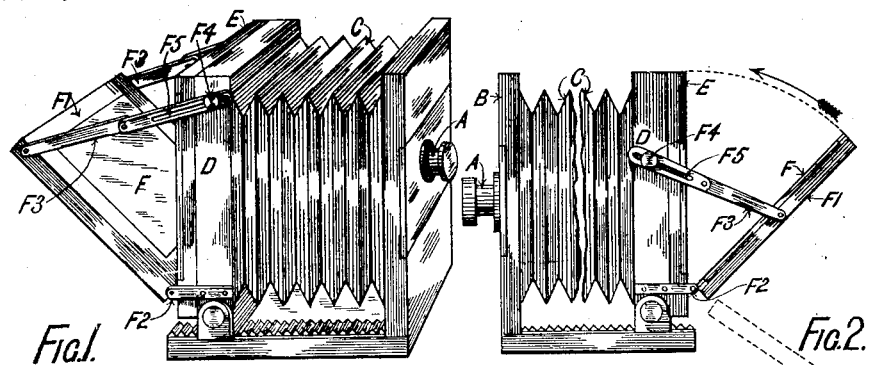
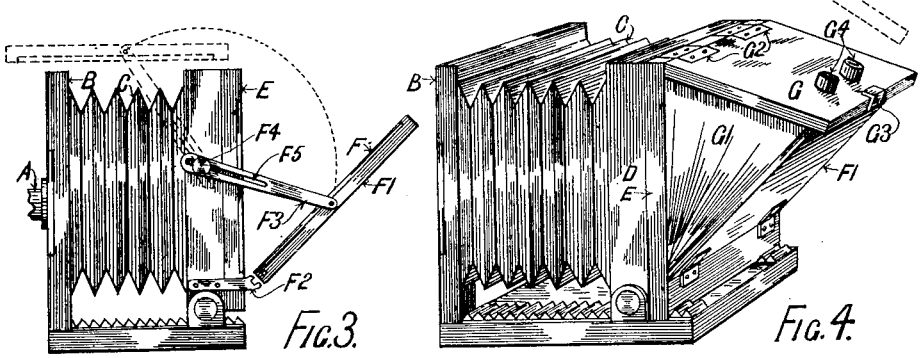
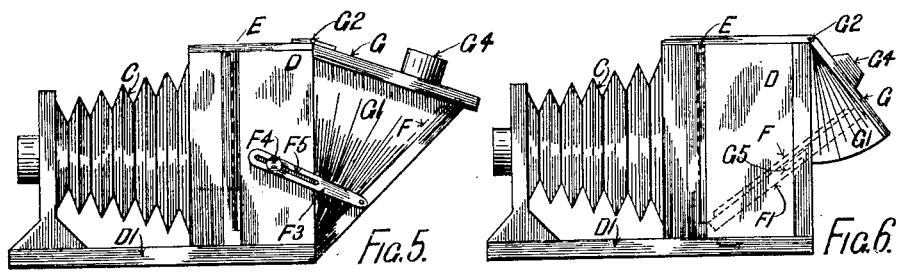
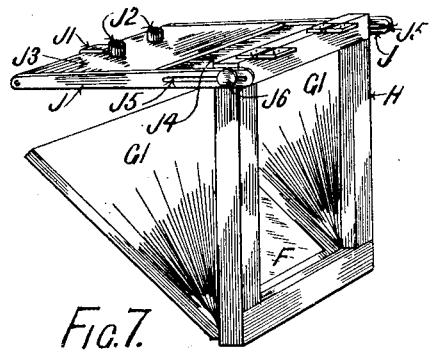 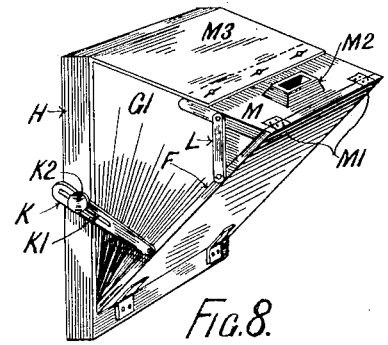

UNITED STATES PATENT OFFICE.

JOSEPH GAUT, OF LEICHHARDT, NEW SOUTH WALES, ASSIGNOR OF ONE-HALF TO JOHN JOSEPH ROUSE, OF SYDNEY, NEW SOUTH WALES.

FOCUSING ATTACHMENT FOR CAMERAS.

SPECIFICATION forming part of Letters Patent No. 659,062, dated October 2, 1900.

Application filed May 10, 1900. Serial No. 16,225. (No model.)

*To all whom it may concern:*

Be it known that I, JOSEPH GAUT, artist, a subject of the Queen of Great Britain, residing at No. 63 Renwick street, Leichhardt, near Sydney, in the British Colony of New South Wales, have invented new and useful Improvements in Focusing Attachments for Photographic Cameras, of which the following is a specification.

These improvements in photographic cameras consist, primarily, in the combination, with the camera, of a detachable focusing attachment consisting of a mirror or reflector having an upward and outward inclination from the lower edge or from near said edge and to the rear of said focusing-screen. These improvements consist, further, in the particular combination, with the aforesaid inclined mirror or reflector, of certain mechanical parts hereinafter particularly described and specifically claimed.

In order that this invention may be clearly understood, reference will now be made to the drawings herewith, which show various constructions of cameras having these present improvements affixed thereto and certain novel features of construction of my improvements or parts thereof ready to be affixed to cameras.

In the said drawings, Figure 1 is a perspective view of a bellows-camera with my invention attached. Fig. 2 is an elevation of a similar camera, taken from the opposite or rearward side of the camera shown in Fig. 1, part of the extensible bellows being broken away to economize space. Fig. 3 is an elevation of a similar camera, taken from the same side, showing some modifications in construction. Fig. 4 is a perspective view of a similar camera, showing a hood or cover for the inclined mirror or reflector. Figs. 5 and 6 are side elevations showing cameras of slightly-different constructions having my invention applied thereto. Fig. 7 is a perspective view showing my invention detached from the camera and so constructed that it may readily be applied to or removed from the same. Fig. 8 is a perspective view showing a slight modification in construction.

In the said drawings the reference-letter A indicates the lens of a camera; B, the front frame; C, the bellows, and D the rear frame, which may, if desired, include a "swing-back."

The letter E denotes the frame of the focusing-screen, which is attached to the back frame D.

F is the focusing mirror or reflector, which is set in a frame $F'$. This frame is jointed to the lower part of the frame E of the focusing-screen by means of straps $F^2$, which are screwed or otherwise fastened to the back frame D or to the swing-back, which when it is used forms a part of said back frame. The ends of the straps project sufficiently to provide supports for pivots which project from the ends of the frame $F'$ in line with its lower side, as shown in Figs. 1, 2, and 3 of the drawings. The upper side of the frame $F'$ is connected to the back frame D by means of bars $F^3$, which are jointed together at their ends, so as to fold. The ends of the jointed bars are pivotally connected to the back frame D by set-screws $F^4$, which pass through slots $F^5$ in two of the bars $F^3$, by means of which the angle of inclination of the mirror or reflector F can be very accurately adjusted.

The type of camera shown is used with the ordinary focusing-cloth, and the image formed upon the ground-glass focusing-screen in the frame E is reflected by the mirror F, upon which it appears in a natural or normal position. When properly focused, the ground-glass screen is replaced by the dark slide, and the sensitive plate is exposed, as is well understood. When the camera is not in use, the frame $F'$ is folded against the frame E, the jointed side bars $F^3$ lying against the ends of said frame. If preferred, however, the pivotal supports can be sprung out of the ends of the straps $F^2$ and the slotted side bars released from the set-screws $F^4$.

The camera shown in Fig. 2 is of the same type as that in Fig. 1, but shows the side bars $F^3$ at a lower point, their connection to the reflector F being at or near the middle point of the ends of the frame $F'$ and to the ends of the back frame D at a point about the same distance below the top of said frame. The position to which the reflector F may be turned when its use is not required is shown in said figure in dotted lines.

In the camera shown in Fig. 3 the projecting ends of the straps F² have half-round open bearings $f$ formed in their ends to receive short studs or pintles $f'$, which project from the lower extremities of the end bars of the frame F'. These pintles are adapted to be placed in the half-round bearings $f$, the frame being supported at an inclination by means of side bars F³, pivoted to the ends of said frame at or near the middle. The end bars in this modification are not jointed, but are slotted and connected to the back frame in substantially the same manner as in Fig. 2. When the reflector is not required, it may be turned to the position shown in dotted lines.

I may hinge the reflector F to the lower side of the frame D, as shown in Fig. 4, and provide it with a hood or cover consisting of extensible and collapsible sides G' and a rigid lid or cover G. One edge of the latter is hinged to the upper side of the frame E, its opposite edge being adapted to rest upon the top of the frame F', to which it may be connected by a catch G³. The cover is provided with sight-openings G⁴, by which the images are focused upon the ground glass and reflected by the inclined mirror. When the camera is not in use, the catch G³ is disconnected, the cover G is raised somewhat, and the reflector is turned up against the frame D, the cover G being then dropped against its outer face or back of the reflector F. The catch G³, which may be a spring or any other form of fastening, can be utilized to hold the cover in the position last mentioned and keep the reflector in place.

Figs. 5 and 6 show my invention applied to cameras having a cavity or chamber back of the focusing-screen to contain dark slides. In this construction the reflector is preferably hinged either to the lower side of the frame D, which forms the chamber, as shown in Fig. 5, or inside the frame D at the lower part of the frame E, as in Fig. 6. Its ends are provided with friction devices G⁵, which bear against the inner faces of the ends of the frame D to hold the reflector at any point. A rigid cover G is hinged to the top of the frame D at the back and provided with folding sides G' and a sight-opening G⁴. The reflector is folded against the frame E when not in use and is held by the friction devices G⁵, the cover G being allowed to drop.

My invention may be a detached part of the camera capable of application thereto when used and of removal when its use is not required. I have shown in Figs. 7 and 8 an attachment of this kind, consisting of a frame K, which may hold the focusing-screen and be attached to the camera in the same way. The reflector F is hinged to the lower side of said frame and is provided with folding sides G', connected to the mirror and to the frame H. A rigid cover J is hinged to the top of the frame H and provided with sight-openings J² and a catch J' to engage the top of the frame of the reflector. The mirror F can be folded up against the frame H, and the cover may then be dropped down over its outer face. The mirror may be supported by side bars K, having slots K' to receive set-screws K², which are screwed into the frame H. The mirror F is provided with side bars L, pivoted at one end to the sides near the top and at the other end to the cover or rigid top M, which is hinged at its edge to the upper edge of the mirror at M'. It has a collapsible sight-frame M², mounted on a rigid part of the cover, the portion M³ of the latter being flexible to allow for the adjustment of the inclination of the mirror.

What I claim is—

The combination with the rear frame of a photographic camera, of a focusing-screen suitably connected thereto, a pair of straps secured to said rear frame and projecting outwardly therefrom, a frame F' pivotally connected at its lower end to said straps, carrying a reflector and capable of variable inclinations, a pair of jointed folding bars connected at one end to near the top of said frame F' and at their opposite end adjustably secured to said rear frame, and means for adjusting said bars lengthwise, substantially as described.

In testimony whereof I have signed my name to this specification in the presence of two subscribing witnesses.

JOSEPH GAUT.

Witnesses:
  FRED WALSH,
  PERCY NEWELL.